United States Patent [19]

Miyazaki

[11] Patent Number: 4,507,590
[45] Date of Patent: Mar. 26, 1985

[54] BRUSHLESS DC MOTOR

[75] Inventor: Kiyoshi Miyazaki, Nagano, Japan

[73] Assignee: Kabushiki Kaisha Sankyo Seiki Seisakusho, Nagano, Japan

[21] Appl. No.: 514,133

[22] Filed: Jul. 15, 1983

[30] Foreign Application Priority Data

Jul. 15, 1982 [JP] Japan ................ 57-123213

[51] Int. Cl.³ .......................................... H02P 6/02
[52] U.S. Cl. .................................. 318/254; 318/313; 318/602
[58] Field of Search ............... 318/138, 254, 313, 314, 318/480, 602

[56] References Cited

U.S. PATENT DOCUMENTS

| 3,324,369 | 6/1967 | Markakis | 318/138 |
| 3,345,547 | 10/1967 | Dunne | 318/254 |
| 3,378,741 | 4/1968 | Sutton | 318/602 |
| 3,753,067 | 8/1973 | Milligan | 318/318 |
| 3,766,458 | 10/1973 | Nishimura et al. | 318/313 |
| 4,107,594 | 8/1978 | Jacobs | 318/685 |
| 4,223,261 | 9/1980 | White | 318/721 |

FOREIGN PATENT DOCUMENTS

| 56-74094 | 6/1981 | Japan | 318/254 |
| 57-91683 | 6/1982 | Japan | 318/254 |

Primary Examiner—J. V. Truhe
Assistant Examiner—Bentsu Ro
Attorney, Agent, or Firm—Sughrue, Mion, Zinn, Macpeak, and Seas

[57] ABSTRACT

A brushless DC motor utilizing only a single position detector and which provides a uniform torque output characteristic with little or no vibration. N phase drive coils are fixedly mounted on a stator yoke. A magnetic rotor assembly, which is rotated by the drive coils, is coupled to rotate a rotary encoder on which m tracks of digitally coded waveform data are recorded. A single m-channel stationary detecting element detects the waveform data produced by rotating the rotary encoder to provide an m-bit parallel signal. The m-bit parallel signal is code converted and applied through power amplifiers to drive the drive coils.

8 Claims, 6 Drawing Figures

BRUSHLESS DC MOTOR

BACKGROUND OF THE INVENTION

The present invention relates to a brushless DC motor. A conventional brushless DC motor includes: a stator on which drive coils are mounted, a magnetic rotor assembly having magnetic poles arranged alternately in the circumferential direction, a position detector for detecting the position of the rotor relative to the stator, and a drive circuit for applying current to the drive coils according to the detection signal of the position detector. In one example of such a brushless DC motor, as disclosed by Japanese Laid-Open Patent Application No. 111689/1980, a rotary encoder coupled to the magnetic rotor is employed as the position detector. Application of current to the drive coils is controlled according to the output signal of the rotary encoder.

The conventional brushless DC motor suffers from the following difficulties: In the case of two-phase drive coils, it is necessary to provide two position detectors for detection of the rotor position, in the case of three-phase drive coils, it is necessary to provide three position detectors, etc. That is, the motor requires a plurality of position detectors, and thus is intricate in its physical and electrical arrangement. The position detection signals are, in general, converted into switching waveforms which are applied to the drive coils without modification. As such, the output torque characteristic of the motor includes harmonic components, which makes the motor vibrate and produce noise. No matter what steps are taken to supply drive signals to the coils which are substantially in the form of a sine wave, it is impossible to obtain signals having a sufficiently high waveform accuracy because of differences in sensitivity between ones of the position detectors, or because of sensitivity variations such as may be due to temperature variations. Accordingly, for this reason also, such a prior art motor is not acceptable.

SUMMARY OF THE INVENTION

An object of the invention is therefore to provide a brushless DC motor which has a simplified arrangement, in which only one position detector is used, and which is so designed as to provide coil driving signals having a high waveform accuracy, thus providing a uniform output torque characteristic such that no vibration is generated.

More specifically, the invention provides a brushless DC motor including n phase drive coils mounted fixedly on a stator yoke, a magnetic rotor assembly positioned to be rotated by the drive coils, a rotary encoder coupled to the magnetic rotor assembly to be rotated thereby with m tracks of digitally coded waveform data being recorded on the rotary encoder, a stationary m-channel detecting element for detecting the waveform data produced by rotating the rotary encoder to thereby provide an m-bit parallel signal, a code converter circuit for converting the m-bit parallel signal from the detecting element to thereby form n phase drive signals, and n power amplifiers for amplifying the n phase drive signals from the converter circuit to apply in response thereto currents to the drive coils. In a preferred embodiment, the code converter circuit can be implemented simply by appropriately delaying the m-bit parallel signal for all but one of the power amplifiers. The code converter circuit can be further implemented with digital-to-analog converters receiving an undelayed and delayed versions of the m-bit parallel signal. Further, the code converter circuit can be implemented with down counters which are preset with the undelayed and delayed versions of the m-bit parallel signal.

DESCRIPTION OF THE PREFERRED EMBODIMENTS

The invention will be described with reference to preferred embodiments shown in the accompanying drawings.

Figure 1:
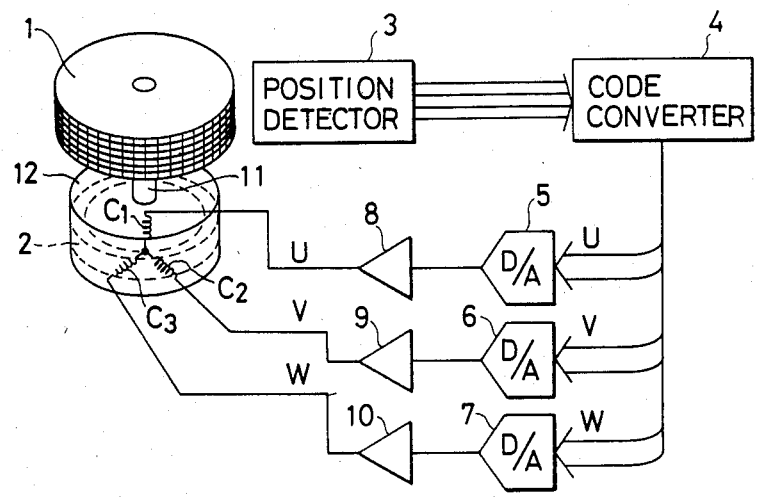
FIG. 1 is a block diagram of a first embodiment of a brushless DC motor of the invention.
Figure 2:
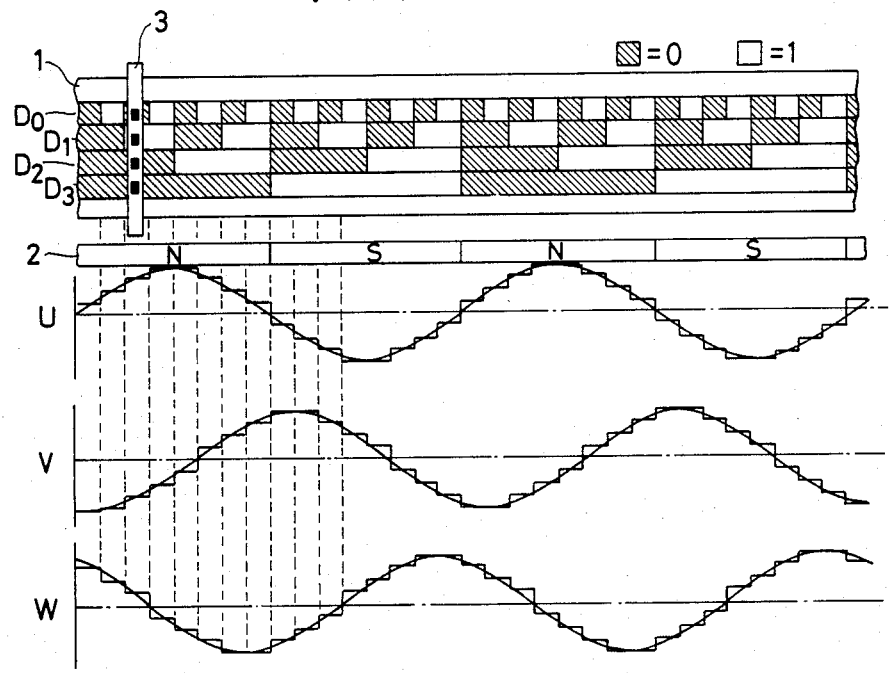
FIG. 2 is an explanatory diagram showing an example of code conversion used in the embodiment of FIG. 1.

As shown in FIG. 1, a position detecting rotor 1 (illustrated schematically) is coupled through a shaft 11 to a rotor 12. The rotor 12 has a magnetic rotor assembly 2 made up of N (north) and S (south) poles which are arranged alternately in the circumferential direction as shown unfolded in FIG. 2 (indicated also by reference numeral 2). The rotor assembly 2 is rotated when three-phase drive coils $C_1$, $C_2$ and $C_3$, which are star-connected, are energized through a drive circuit (described below). Four-bit patterns $D_0$, $D_1$, $D_2$ and $D_3$ as shown in FIG. 2 are formed on the cylindrical wall of the position detecting rotor 1. These bit patterns are read, one bit from each pattern at a time, by a four-channel position detector 3 which is fixedly provided on the stator side. The bit patterns and the position detector 3 may be replaced by a magnetic track and a magnetic head, or by an optical pattern and light emitting and receiving elements, or by any other suitable equivalent arrangement. In addition, the number of bits may be increased or decreased depending on the intended use of the motor.

The four-bit digital signal detected by the position detector 3, which forms a position signal, is applied to a code converter 4 to provide digital phase signals U, V and W, which are signals shifted about $2\pi/3$ in phase from one another, in response to the position signal from the position detector 3 which changes cyclically as the position detecting rotor 1 turns. This can be done merely by appropriately delaying the V and W output signals relative to the U output signal. The output signals for the three phases are applied to D/A (digital-to-analog) converters 5, 6 and 7. The outputs of the D/A converters 5, 6 and 7 are applied to the three-phase coils $C_1$, $C_2$ and $C_3$, after being amplified by amplifiers 8, 9 and 10, respectively.

It is assumed that the rotor 1 is moved in the right-to-left direction in FIG. 2, that is, the position detector 3 is moved in the left-to-right direction in FIG. 2. The position detector 3 detects the bit patterns on the wall of the rotor 1 and produces in response thereto a four-bit digital signal. This signal is a digital signal, the period of which corresponds to 16 cells, as is clear from the bit pattern in FIG. 2. The code converter 4 applies the digital signal from the detector 3 directly to the U-phase D/A converter 5, and also converts the digital signal into digital signals which are shifted by approximately $2\pi/3$ in phase from each other, and applies the latter to the V-phase D/A converter 6 and to the W-phase D/A converter 7, respectively. Table 1 below shows one example of such code conversion by the code converter 4.

More specifically, digital signals provided by the code converter 4 for the three phases, specifically, bits $D_0$ through $D_2$, $D_0'$ through $D_2'$ and $D_0''$ through $D_2''$, respectively, are applied to the preset input ports of down counters 15, 16 and 17, respectively. Bits $D_3$, $D_3'$ and $D_3''$ are applied as current direction switching signals to a U-phase current direction switching circuit including AND gates 21 and 22 and an inverter, a V-phase current direction switching circuit including AND gates 23 and 24 and an inverter, and a W-phase

TABLE 1

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| U | | | | | | | | | | | | | | | | |
| $D_0$ | 0 | 1 | 0 | 1 | 0 | 1 | 0 | 1 | 0 | 1 | 0 | 1 | 0 | 1 | 0 | 1 |
| $D_1$ | 0 | 0 | 1 | 1 | 0 | 0 | 1 | 1 | 0 | 0 | 1 | 1 | 0 | 0 | 1 | 1 |
| $D_2$ | 0 | 0 | 0 | 0 | 1 | 1 | 1 | 1 | 0 | 0 | 0 | 0 | 1 | 1 | 1 | 1 |
| $D_3$ | 0 | 0 | 0 | 0 | 0 | 0 | 0 | 0 | 1 | 1 | 1 | 1 | 1 | 1 | 1 | 1 |
| V | | | | | | | | | | | | | | | | |
| $D_0'$ | 1 | 0 | 1 | 0 | 1 | 0 | 1 | 0 | 1 | 0 | 1 | 0 | 1 | 0 | 1 | 0 |
| $D_1'$ | 1 | 0 | 0 | 1 | 1 | 0 | 0 | 1 | 1 | 0 | 0 | 1 | 1 | 0 | 0 | 1 |
| $D_2'$ | 0 | 1 | 1 | 1 | 1 | 0 | 0 | 0 | 0 | 1 | 1 | 1 | 1 | 0 | 0 | 0 |
| $D_3'$ | 1 | 1 | 1 | 1 | 1 | 0 | 0 | 0 | 0 | 0 | 0 | 0 | 1 | 1 | 1 | 1 |
| W | | | | | | | | | | | | | | | | |
| $D_0''$ | 1 | 0 | 1 | 0 | 1 | 0 | 1 | 0 | 1 | 0 | 1 | 0 | 1 | 0 | 1 | 0 |
| $D_1''$ | 0 | 1 | 1 | 0 | 0 | 1 | 1 | 0 | 0 | 1 | 1 | 0 | 0 | 1 | 1 | 0 |
| $D_2''$ | 1 | 1 | 1 | 0 | 0 | 0 | 0 | 1 | 1 | 1 | 1 | 0 | 0 | 0 | 0 | 1 |
| $D_3''$ | 0 | 0 | 0 | 1 | 1 | 1 | 1 | 1 | 1 | 1 | 1 | 0 | 0 | 0 | 0 | 0 |

The digital signals thus code converted for the three phases are converted into analog signals by the D/A converters 5, 6 and 7, respectively. The analog signals are substantially in the form of a sine wave as shown in FIG. 2 wherein they are indicated by U, V and W, respectively. It is apparent from FIG. 2 that these analog signals are shifted approximately $2\pi/3$ in phase from one another. Therefore, when these analog signals are applied to the three-phase coils $C_1$, $C_2$ and $C_3$ through the amplifiers 8, 9 and 10, respectively, a rotating magnetic field is induced in a predetermined direction, so that the magnetic rotor assembly is rotated together with the rotors 1 and 12 in synchronization therewith. The direction of rotation can be reversed by shifting the conversion codes for the U, V and W phases by 180° in electrical angle. In this case, the phases are shifted in the opposite direction so that the direction of the rotating magnetic field is reversed.

Further, one or more additional bit patterns can be added on the rotor 1, and detected for use as a speed control signal. Moreover, control can be effected with the $D_0$ bit as the speed control signal and with the $D_3$ bit as a phase control signal. Employment of the $D_0$, $D_1$, $D_2$ and $D_3$ bits as speed control signals permits proportional speed controls.

In practice, sometimes the position detection signal outputted by the position detector may not be suitable for the D/A converters if not processed. In order to overcome this difficulty, the code converter 4 can be used to make the signal suitable for use by the D/A converters.

Figure 3:
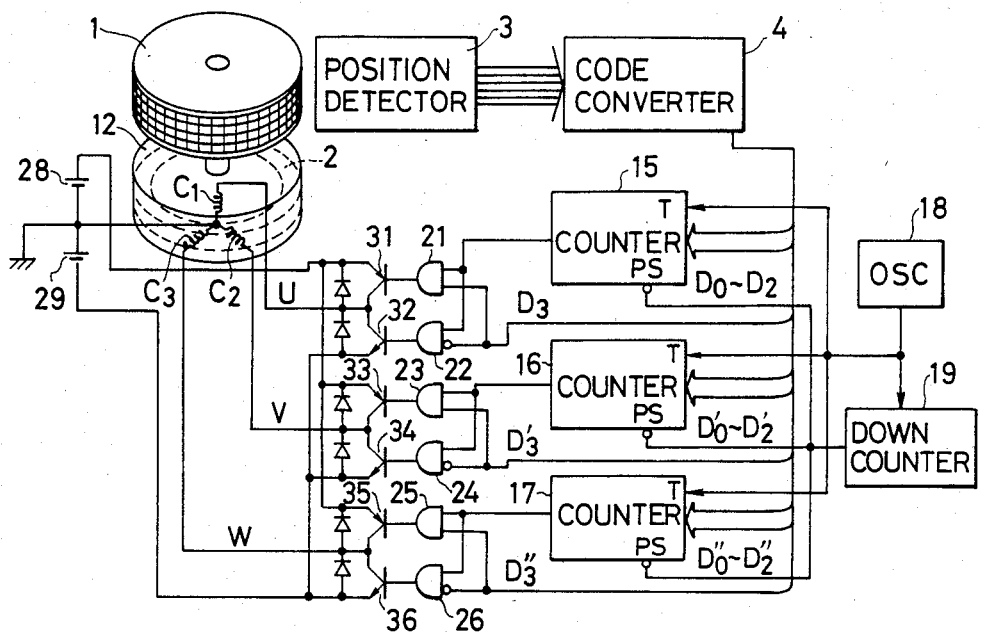
FIG. 3 is a block diagram of a second embodiment of a brushless DC motor of the invention.
Figure 4:
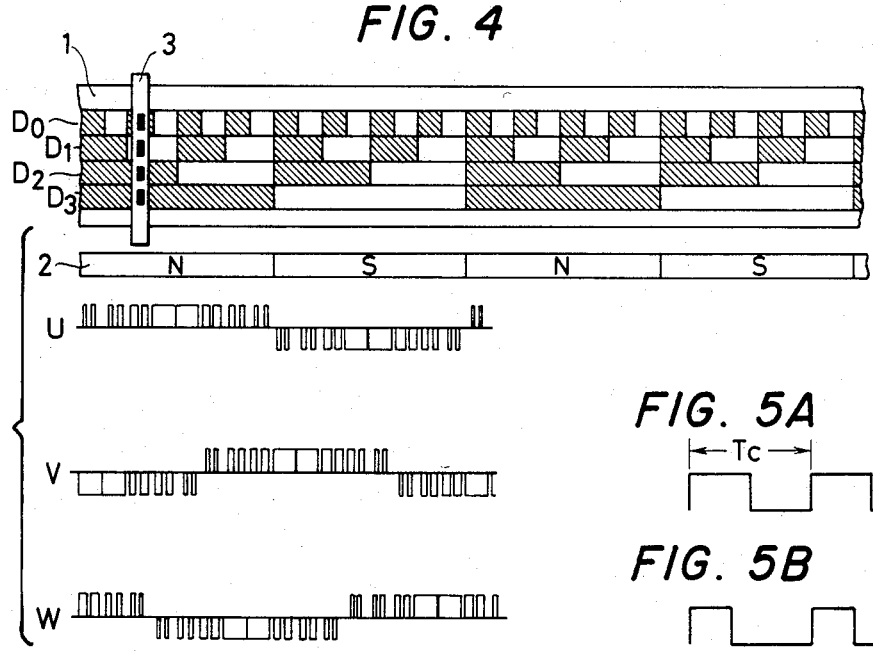
FIG. 4 is an explanatory diagram showing an example of code conversion used in the second embodiment of FIG. 3.

Another embodiment of the invention will be described with reference to FIG. 3. In this embodiment, the arrangement of the position detecting rotor 1, rotor 12, magnetic rotor assembly 2, position detector 3 and code converter 4 is the same as that of those in the first embodiment of FIG. 1. The second embodiment differs though from the first embodiment in that the drive coils $C_1$, $C_2$ and $C_3$ are driven using a PWM (Pulse Width Modulation) technique.

current direction switching circuit including AND gates 25 and 26 and an inverter. A pulse oscillator 18 applies a clock pulse signal to the clock input terminals T of the counters 15, 16 and 17. The clock pulse signal is further applied to a down counter 19. The down counter 19 counts downwardly in response to the clock pulse signal to thus provide a load signal which is applied to the preset signal terminals of the counters 15, 16 and 17. The output of the counter 15 is applied to the U-phase current direction switching circuit including the AND gates 21 and 22. The output of the counter 16 is applied to the V-phase current direction switching circuit including the AND gates 23 and 24. Similarly, the output of the counter 17 is applied to the W-phase current direction switching circuit including the AND gates 25 and 26. The outputs of the AND gates 21, 22, 23, 24, 25 and 26 are applied to switching transistors 31, 32, 33, 34, 35 and 36, respectively.

Figure 5A:
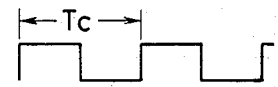
FIGS. 5A and 5B are timing charts for a description of the operation of a pulse width modulator section used in the second embodiment.
Figure 5B:

When the transistor 31 is conductive (on), a forward current flows from a power source 28 through the U-phase drive coil $C_1$, and when the transistor 32 is conductive, a current flows from a power source 29 through the coil $C_1$ in the reverse direction. Similarly, when the transistor 33 is conductive, a forward current flows through the drive coil $C_2$, and when the transistor 34 is conductive, a current flows through the drive coil $C_2$ in the reverse direction. When the transistor 35 is conductive, a forward current flows through the drive coil $C_3$, and when the transistor 36 is conductive, a reverse current flows through the coil $C_3$.

the operation of the DC brushless motor thus constructed will be described. As in the above-described first embodiment, the position detector 3 reads the waveform data of the rotor 1 which has been digitally coded and recorded. The code converter 4 converts the output signal from the detector 3 into digital code signals for the U, V and W phases. Of these digital code signals, three bits $D_0$ through $D_2$, three bits $D_0'$ through $D_2'$ and three bits $D_0''$ through $D_2''$ are applied, as preset signals, to the down counters 15, 16 and 17, respectively, and the remaining bits $D_3$, $D_3'$ and $D_3''$ are applied to the current direction switching circuits for the U, V and W phases, respectively. On the other hand, the down counter 19 counts down the clock pulse signal from the oscillator 18 to produce a load signal having a period $T_c$, as shown in FIG. 5A, which is applied to the preset signal (load) input terminals of the counters 15, 16 and 17. Each of the counters 15, 16 and 17 outputs an "H" (high) level signal upon being reset at the rising edge of the load signal (see FIG. 5B), and starts counting downwardly in response to the output signal from the oscillator 18. When the count value of each counter reaches zero and the output is at the "L" (low) level, the counting operation is stopped. When the output of the counter 19 rises again, the counters 15, 16 and 17 start their counting operations again. The periods of time which elapse from the time instant that the counters 15, 16 and 17 start their counting operations until the counters are halted, that is, the periods of time for which the outputs of the counters are maintained at the "H" level, depend on the values of the digital signals applied as preset signals to the counters 15, 16 and 17. Therefore, pulse-width-modulated signals, which have a variable pulse width, are outputted according to the values of the three-phase digital signals.

Of the digital signals, bits $D_3$, $D_3'$ and $D_3''$ are applied as current direction switching signals to the current switching circuits for the respective three phases. Therefore, the directions of the coil currents are changed in synchronization with the pulse width variation period. Thus, currents are applied to the coils $C_1$, $C_2$ and $C_3$ alternately in the forward and reverse directions according to the pulse-width-modulated signals for the three phases. The amount of current applied to each coil corresponds to the integration period of the respective pulse-width-modulated signal. That is, a current which is substantially in the form of a sine wave is applied to each coil. The currents applied to the coils are shifted by about $2\pi/3$ from one another by the code converter 4. Therefore, the rotor is rotated in the second embodiment in the same manner as in the first embodiment.

In both the above-described embodiments, the output duty cycle and the position of the bit pattern of the rotor depend on the code conversion method employed. Accordingly, the bit pattern and the code conversion method should be suitably selected in designing the DC brushless motor.

According to the invention, only one position detector need be provided, irrespective of the number of phases of the drive coils. Therefore, the brushless DC motor of the invention has a simple physical and electrical arrangement, and is free from the drawbacks which arise when a plurality of position detectors are employed, that is, drawbacks such as fluctuations in the sensitivity of the position detectors. Thus, the motor of the invention will rotate smoothly at all times. Furthermore, as each drive coil is driven by a signal which is substantially in the form of a sine wave, vibration and variations in output torque are eliminated in the brushless DC motor of the invention.

The number of phases of drive coils and the number of bits of the waveform data recorded in the rotor may be varied as desired.

I claim:
1. A brushless DC motor comprising:
   n phase drive coils mounted fixedly on a stator yoke;
   a magnetic rotor assembly positioned to be rotated by said drive coils;
   a rotary encoder coupled to said magnetic rotor assembly to be rotated thereby, m tracks of digitally coded waveform data being recorded on said rotary encoder, said m tracks of waveform data collectively representing a plurality of different values at a respective plurality of different positions around the periphery of said rotary encoder; a stationary m-channel detecting element for detecting waveform data produced by rotating said rotary encoder to produce an m-bit parallel signal having a plurality of relative positions of said encoder and said detecting element;
   a code converter circuit for code converting said m-bit parallel signal from said detecting element to form n phase drive signals each having a different value determined in accordance with the value of said m-bit parallel signal; and
   power amplifiers for amplifying said n phase drive signals from said converter circuit to apply in response thereto currents to said drive coils.

2. The brushless DC motor of claim 1, wherein said digitally coded waveform data comprises data arranged such that said m-bit parallel signal produced by said m-channel detecting element is in the form of a continuously cycling count.

3. The brushless DC motor of claim 1, wherein said code converter circuit comprises means for selectively delaying said m-bit parallel signal to produce respective n digital phase signals.

4. The brushless DC motor of claim 3, wherein said code converter circuit further comprises n digital-to-analog converters, each of said digital-to-analog converters receiving on a digital input port thereof a corresponding one of said digital phase signals.

5. The brushless DC motor of claim 3, wherein said code converter circuit further comprises first through third presettable down counters, each of said first through third presettable down counters having a preset input port receiving a respective one of said n digital phase signals; a clock pulse oscillator, an output of said clock pulse oscillator being coupled to clock signal inputs of each of said first through third down counters; and a fourth down counter having a clock input coupled to said output of said clock pulse oscillator and an output, which is in a predetermined logic state when said fourth down counter reaches a predetermined count, coupled to preset inputs of each of said first through third down counters, outputs of said first through third down counters forming said n phase drive signals.

6. The brushless DC motor of claim 5, further comprising means for selectively inverting said outputs of said first through third down counters in response to a current direction reverse control signal.

7. The brushless DC motor of claim 6, wherein said reverse control signal comprises one bit of each of said n digital phase signals.

8. The brushless DC motor of claim 6, wherein when said outputs of said first through third down counters are selectively inverted in response to said current direction reverse control signal, said power amplifiers reverse the plurality of said current supplied to said drive coils without changing the direction in which said rotor assembly is driven.

* * * * *